United States Patent [19]

Le Bras

[11] 4,043,821

[45] Aug. 23, 1977

[54] VITROCERAMIC MATERIALS AND PROCESS OF MAKING THE SAME

[75] Inventor: Eugene Le Bras, Franconville-La Garenne, France

[73] Assignee: Compagnie Internationale de Minerallurgie - CIM, Neuilly-sur-Seine, France

[21] Appl. No.: 709,430

[22] Filed: July 28, 1976

[30] Foreign Application Priority Data

June 28, 1975 France .................................. 75.23428

[51] Int. Cl.$^2$ .............................................. C03C 3/22
[52] U.S. Cl. ...................................... 106/39.6; 106/52
[58] Field of Search ................................. 106/39.6, 52

[56] References Cited

U.S. PATENT DOCUMENTS

| | | | |
|---|---|---|---|
| 3,193,503 | 7/1965 | Smith | 106/39.6 |
| 3,268,315 | 8/1966 | Stookey | 106/39.6 |
| 3,557,575 | 1/1971 | Beall | 106/39.6 |
| 3,694,360 | 9/1972 | Weaver | 106/39.6 |
| 3,901,716 | 8/1975 | Rogers et al. | 106/39.6 |
| 3,928,047 | 12/1975 | Kapolyi et al. | 106/39.6 |
| 3,955,989 | 5/1976 | Nakamura | 106/39.6 |

*Primary Examiner*—Winston A. Douglas
*Assistant Examiner*—Mark Bell
*Attorney, Agent, or Firm*—Pennie & Edmonds

[57] ABSTRACT

A vitroceramic product which is economical to produce and has excellent resistance to bending and abrasion comprising at least 90% by weight of said product of the following ingredients expressed in percent by weight thereof;

$SiO_2$ + $Al_2O_3$ + $B_2O_3$ in from 40 to 50%, iron oxide in from 16 to 30%, and CaO + MgO in from 24 to 40%; the sum of the $Al_2O_3$ + $B_2O_3$ being from 2 to 15 percent and the product including at least 0.5% by weight of nucleus forming agent.

7 Claims, 1 Drawing Figure

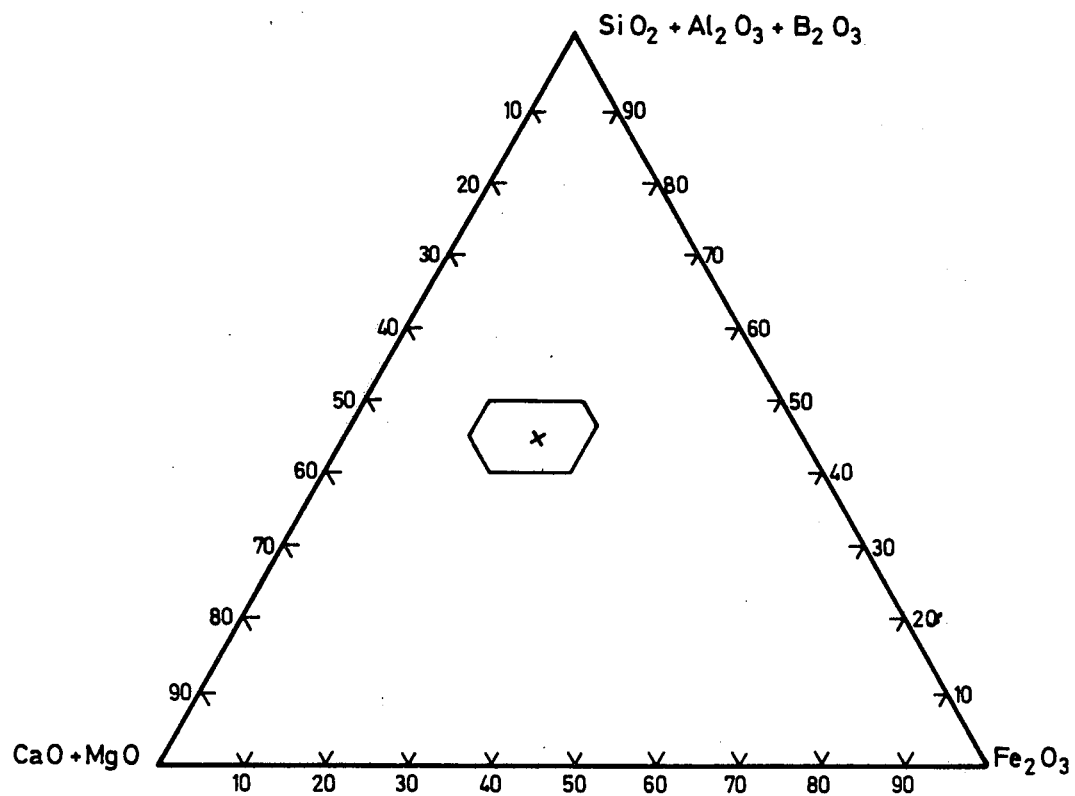

VITROCERAMIC MATERIALS AND PROCESS OF MAKING THE SAME

The present invention relates to the manufacture of vitroceramic materials which possess good physical and chemical properties and are inexpensive to produce. Materials of this type are in great demand for many applications, particularly for wall and floor coverings and laboratory benches, etc. The vitroceramic materials according to the invention are specifically characterized by their good mechanical resistance to bending and their wear resistance.

The vitroceramic products according to the present invention were developed in the course of research carried out on low-cost vitrifiable mixtures, more particularly those which avoid the use of alkaline oxides, as the high cost of the raw materials for the latter would considerably increase the cost of the vitrifiable mixture for numerous vitroceramics.

The present invention relates to vitroceramic products in which mainly silicon, iron and calcium oxides are used. These raw materials are readily available as they can be obtained, for example, from quarry products or industrial waste products and are thus inexpensive.

In using compositions of this type the applicant was also seeking to obtain certain features of the ternary diagrams $SiO_2$—$Fe_2O_3$—CaO and $SiO_2$—FeO—CaO which are featured, for example, in the article "Phase Diagrams," Materials/Science Technology, Vol. 2, pages 106 and 107. A common feature of these diagrams is that in their central region they possess a zone in which the temperatures of liquids are relatively low and the isotherms spaced far apart, which is particularly desirable for the preparation and forming of glass at reduced temperature levels, at which, furthermore, the crystalline forms likely to precipitate are reduced in number and in many cases are also identical (pseudo-wollastonite, rankinite, and tridymite) which increases the possibility of satisfactorily repeating the results of ceramification.

The vitroceramic products according to the present invention which, as has been stated, contain mainly silicon, iron and calcium oxides, are characterized in that they also contain aluminum, boron and possibly magnesium oxides in the following quantities, which are expressed in % by weight of the oxides contained in the prepared product:

$SiO_2$ + $Al_2O_3$ + $B_2O_3$ 40–50%
$Fe_2O_3$ 16–30%
CaO + MgO 24–40% the sum of $Al_2O_3$ + $B_2O_3$ being 2–15% and the sum of the above oxides representing at least 90% of the weight of the end products. The end product also contains a nucleus forming agent in a quantity of at least 0.5%.

This type of composition is represented in FIG. 1 in the triangular diagram ($SiO_2$ + $Al_2O_3$ + $B_2O_3$); (CaO + MgO); $Fe_2O_3$. The other oxides are omitted.

The nucleus forming agent which enabled the finest crystallization and best performances to be obtained was chromium oxide, more specifically in the following preferred compositions (% by weight):

| $SiO_2$ | $Al_2O_3$ | $B_2O_3$ | CaO | MgO | $Fe_2O_3$ | $Cr_2O_3$ |
|---------|-----------|----------|-----|-----|-----------|-----------|
| 34–40 | 2–6 | 2–6 | 25–38 | 0–10 | 18–27 | 0.7–2 |

The vitrifiable mixtures corresponding to the product compositions according to the invention only require relatively low temperatures (1350°–1400° C.) for the preparation of refined glass forms. In addition, conventional basic refractory elements based on MgO and $Cr_2O_3$ can be used to produce the interiors of furnaces designed for fusing these glass forms.

During preparation of the glass, the oxydo-reduction state of the molten bath should be maintained without precipitation of iron in the free state.

The glass forms produced have a steeply sloping viscosity curve and consequently have a relatively short working stage. However, they can be formed with conventional glass working means and furthermore their marked fluidity at high temperatures means that certain special techniques which have hitherto been used in the metallurgical industry can be used to form the same.

If, after the forming operation, it is wished to cool the articles obtained to the ambient temperature, for example, in order to carry out an easier, less costly working operation while these articles are still in the vitreous state, they can generally be subjected to a thermal annealing treatment. The glass forms covered by the invention have a fairly high expansion coefficient on the order of $75 \times 10^{-7}$.

As is generally the case, the thermal ceramification process preferably comprises the following two successive stages: first, the nucleation stage in which numerous fine crystalline nuclei are initially produced, and second, the crystallization or crystal development stage in which fine crystals are formed from the nuclei, the crystals being abundantly and uniformly distributed throughout the thickness of the articles. The processing conditions vary slightly according to the quality standards required for the ceramified product but, at any event, it is not necessary to employ excessively lengthy ceramic forming processes or particularly high temperatures to obtain high quality products. For example, mechanical resistances to bending on the order of 20 hbars and/or Capon Index wear resistances of 6,000–8,000 can be obtained with thermal processing stages of 30 minutes duration. The temperature ranges of these stages are approximately 750°–800° C. for the nucleation stage and approximately 900° C. for crystal development.

When it is desired to increase particularly the wear resistance of a product, the practice generally employed is to reduce the temperature and the length of the crystallization or crystal development process and also to reduce the temperature of the nucleation stage with an increase in the duration thereof.

The above-described limits relating to the composition of the products have been determined as a result of examination of products and performances of the vitroceramified products produced, and from observations made during implementation of the invention in the glass preparation, glass forming and/or ceramification stages, as will be described in the embodiments set forth hereafter.

Additional limitations must be taken into consideration when selecting the raw materials to be used for preparing the vitrifiable mixture based on their content of certain minor constituents.

Thus, to avoid an overly marked devitrification tendency, it is advisable to limit the quantity of mineralizing agents. The quantities of fluorides and phosphates in particular, expressed in the form of $F_2Ca$ and $(PO_4)_2Ca_3$, respectively, are preferably such that $F_2Ca$ is less than 1% and the sum $F_2Ca + (PO_4)_2Ca_3$ is less than 3% of the weight of the prepared glass. Similarly, the applicant has noted that the total quantity of alkaline oxides should preferably be kept lower than 3% as these elements could produce parasitic crystals and extremely heterogeneous and coarse crystallization, particularly on the surface.

The vitroceramified products according to the invention are opaque and have a fairly deep brownish color. They have a pleasant, matte satin-like or slightly shiny surface and they are easy to maintain even without an initial surface finishing process involving mechanical polishing.

Ceramification of the glass products according to the invention is generally accompanied by an increase in the mass volume of the product of up to 3%. That of the ceramified products is on the order of 3.1–3.2 g/cm$^3$. It varies, in particular, with the proportions of the various kinds of the crystalline phase, mainly wollastonite (CaO, SiO$_2$) having a mass volume of 2.8–2.9 g/cm$^3$ and hedenbergite (CaFeSi$_2$O$_6$), having a mass volume of 3.5–3.6 g/cm$^3$. Other kinds, which are possibly present in smaller quantities, are: rankinite (3CaO.2SiO$_2$), and calcium and magnetite ferrites. Ferromagnetism, which is a manifestation of the crystallization of magnetite, seems to be promoted by increasing the crystal development temperature, and is normally very low, so long as the temperature is below 950° C.

The linear expansion coefficient of the vitroceramic products according to the invention is slightly lower than that of the glass mother products, i.e., the corresponding vitrified products which have not yet been ceramified. The coefficient decreases when the crystal development temperature increases and can drop to approximately $70 \times 10^{-7}$.

The bending resistance of the vitroceramic products according to the invention has already been indicated as being one of their most important features. When measured by the method of bending the product between four application points, this resistance attained values on the order of 20 hbars, i.e., in a non-standardized unit, 20 kg/mm$^2$. These performances are two to three times higher than in the case of ordinary annealed silico-soda-calcic glass.

The wear resistance of the vitroceramic products according to the invention is another particularly important feature for certain applications. Values of 6,000–10,000 were measured by the Capon method according to NF.P.61.301 standard for the wear resistance of the vitroceramics according to the invention whereas the value obtained for molten basalt which was long considered as having particularly high values, is of the order of 4,500.

It is apparent that these properties, combined with a good performance vis-a-vis the normal chemical products, renders the products according to the invention particularly suitable for certain applications such as floor coverings for public places, conduits for loose materials comprising abrasive products, ground materials, etc.

Various non-limitative examples of vitroceramic products and certain of their properties are provided hereinafter to illustrate the advantages of the invention and its various features.

EXAMPLE 1

Vitroceramic products according to the invention were produced from a glass No. 1, whose composition lies substantially in the center of the group of compositions claimed.

This composition (expressed in % by weight of oxides) is: 37% of SiO$_2$, 22% of Fe$_2$O$_3$, 32% of CaO, 4% of B$_2$O$_3$, 4.25% of Al$_2$O$_3$, and 0.75% of Cr$_2$O$_3$.

The vitrifiable mixture is constituted by the following raw materials (in kilograms per 100 kilograms of glass to be processed):

| | |
|---|---|
| Sand | 31.5 |
| Limestone | 52.8 |
| Calcined pyrites | 22.2 |
| Colemanite | 9.4 |
| Kaolin | 10.5 |
| Chrome Iron Ore | 1.69 |
| | 128.09 |

In the triangular diagram shown in FIG. 1, the point indicating the above composition is marked by a cross within the range claimed by the present application.

The operations of fusing and refining the glass are carried out without exceeding temperatures of the order of 1,450° C. in a furnace whose refractory lining is based on Cr$_2$O$_3$ and MgO and which is heated by oil burners whose combustion is regulated at a 5% excess of air.

The refined glass produced is cast in the form of panels approximately 6 mm. in thickness which are annealed in a conventional manner by means of a cooling operation carried out at a temperature between 700° and 550° C.

Machined test pieces are then manufactured from this annealed glass by means of a diamond tipped grinder having a granulometry of 45 μm. These test pieces, which have a cross-section of 5 × 5 mm., are used to determine the characteristics of the mother glass (i.e., the glass obtained prior to the thermal nucleation and crystallization stages) as well as the characteristics of the ceramified products indicated hereinafter.

CHARACTERISTICS OF THE GLASS

The glass per se is black in color and has a mass volume of 3.12 g/cm$^3$ at 20° C.

Some of the temperature characteristics of the glass are indicated hereinafter (in °C). They have been measured according to the French standard NF-B30-010.

TABLE I

| Temperature Characteristics | Symbol | Annealed | Tempered |
|---|---|---|---|
| Lowest Annealing Temperature | $T_I$ | — | 550 |
| Average Transformation Temperature | $T_M$ | 651 | 656 |
| Deformation Temperature | $T_D$ | 682 | 690 |

The linear expansion coefficient of the glass between 20° and 300° C. is $80 \times 10^{-7}$ per degree centigrade. The upper devitrification temperature is approximately 1,250° C. The resistance to bending determined by means of the 4-point application method is 10 hbars (to be compared with 8.7 hbars in the case of Float glass).

The measurement of its resistance to abrasion by rubbing (Capon machine) leads to an index of 1,700.

The viscosity of the glass varies rapidly as a function of the temperature. The logarithm of the viscosity is 2 at 1,190° C. and 3 at 1,150° C., but the measurement is rapidly affected by the appearance of a crystalline phase.

CHARACTERISTICS OF THE CERAMIFIED PRODUCTS

Numerous thermal nucleation and crystallization processes were carried out. Only a few examples thereof are represented in Table II. These share in common the rate of temperature increase, which is uniformly 3° C./min., and the cooling method which is carried out upon termination of the period of dwell at the highest temperature by interrupting the electricity supply to the furnace. This natural cooling operation is essentially carried out at a rate of 5° C./min to a temperature of 300° C. at which the test pieces can be placed in the ambient atmosphere without risk of damage.

TABLE II

| Type of Process | Nucleation Temperature (° C.) | Duration (Hours) | Ceramification Temperature (° C.) | Duration (Hours) | Bending Resistance (hbars) | Wear Resistance (Capon Index) |
|---|---|---|---|---|---|---|
| A | 750 | 0.5 | 900 | 0.5 | 20 | 6,000 |
| B | 700 | 0.5 | 850 | 0.5 | 18 | 7,000 |
| C | 700 | 2 | 850 | 0.5 | 19 | 10,000 |
| D | 800 | 0.5 | 950 | 0.5 | 22 | 5,000 |
| E | 850 | 0.5 | 1000 | 0.5 | 16 | 3,500 |

The temperature ranges which can be used for nucleation vary between 675° and 850° C., and between 850° and 1,000° C. for development of the crystals.

The results of the bending resistance and wear resistance measurements indicated in Table II—which are the average values determined from groups of eight test pieces—show that it is possible to obtain simultaneously the two desired properties to a high degree.

In other tests, which have not been set forth here, it was determined that when wear resistance is the most sought-after property, it is advantageous to reduce both the temperature and the duration of crystal development, as well as the temperature of nucleation, with appropriate lengthening of the duration of the nucleation stage.

As stated above, the ceramified product contains wollastonite and hedenbergite crystals.

Examination of the diffractogram X indicates that these crystals are not pure, that Ca-Fe substitutions can exist in these crystals, and that rankinite, calcium ferrite and magnetite crystals may also be joined thereto.

The expansion coefficient between 20° and 300° C. of these ceramified test pieces ranges between $75 \times 10^{-7}$ and $70 \times 10^{-7}$; lowest values are obtained with the highest crystal development temperatures.

The specific gravity of the ceramified products is of the order of 3.1 g/cm³.

EXAMPLE 2

Indicated in Table III are examples of glass forms which were prepared under similar conditions to those described in the case of glass form No. 1 of the preceding example. Dolomite has been added to the raw materials indicated in Example 1, for compositions containing MgO.

Compositions containing an alkaline oxide $Na_2O$, which was added in the form of sodium sulfate, were intentionally produced. In addition to the above-mentioned disadvantage constituted by the cost of the raw material in the case of alkaline oxides, the presence of the latter also results in poor crystallization. In the case of glass comprising 2% $Na_2O$ (glass No. 28), after thermal treatment, the ceramified glass has a mediocre resistance to bending. In the case of a glass containing 5% $Na_2O$ (glass No. 29) it was only possible to obtain coarse heterogeneous crystallization resulting in mediocre and dispersed properties whatever the thermal treatment employed.

The glass compositions are expressed in % by weight of the oxides; the quantities of raw materials being calculated in a conventional manner, as in Example 1. The dashes in the various columns in Table III are the equivalent of ditto marks, and indicate that the last quantity above the respective dashes is used.

Table III indicates a thermal treatment for each type of glass which represents a good compromise between the bending resistance and wear resistance while extending the treatment duration as little as possible. These treatments are identified by the letters A, B, C and D which correspond to the thermal nucleation and crystallization treatments indicated in Table II.

In the case of glass Nos. 7, 8, 14, 21, 23, 24 and 29, significant results were not obtained with any thermal treatment. This is indicated by three dots ( . . . ) in the thermal treatment columns and by their corresponding properties. It should be noted that a number of the compositions indicated in Table III do not fall within the scope defined by the claims of the present application. They have been cited by way of comparison to indicate the advantages of the compositions according to the present invention.

As a result, the following compositions do not fall within the preferred ranges of the invention: Compositions Nos. 2, 6, 7, 15 and 20 where $SiO_2 + Al_2O_3 + B_2O_3$ does not lie between 40 and 50%; compositions Nos. 8, 14, 15, 22, 23 and 24 where $Fe_2O_3$ does not lie between 16 and 30%; and compositions Nos. 21 and 23 where CaO + MgO does not lie between 24 and 40%.

Compositions containing alkaline products are not excluded from the invention as long as the quantity of alkaline oxides is lower than 3% by weight.

TABLE III

| No | COMPOSITIONS OF THE GLASS (% by weight) | | | | | | | | Type of Treatment | Vitroceramics Bending Resistance | Wear Resistance | Observations |
|---|---|---|---|---|---|---|---|---|---|---|---|---|
| | $SiO_2$ | $Fe_2O_3$ | CaO | MgO | $B_2O_3$ | $Al_2O_3$ | $Na_2O$ | $Cr_2O_3$ | | | | |
| 2 | 30 | 22 | 39 | | 4 | 4.25 | | 0.75 | C | 8 | 2000 | |

TABLE III-continued

| No | COMPOSITIONS OF THE GLASS (% by weight) | | | | | | | Type of Treatment | Vitroceramics Bending Resistance | Wear Resistance | Observations |
|---|---|---|---|---|---|---|---|---|---|---|---|
|    | SiO$_2$ | Fe$_2$O$_3$ | CaO | MgO | B$_2$O$_3$ | Al$_2$O$_3$ | Na$_2$O | Cr$_2$O$_3$ | | | |
| 3  | 32 | — | 37 | — | — | — | — | — | C | 12 | 3500 | |
| 4  | 34 | — | 35 | — | — | — | — | — | B | 17 | 7000 | |
| 5  | 40 | — | 29 | — | — | — | — | — | B | 18 | 6000 | |
| 6  | 42 | — | 27 | — | — | — | — | — | D | 14 | 3000 | |
| 7  | 44 | — | 25 | — | — | — | — | — | ... | ... | ... | Devitrification |
| 8  | 37 | 15 | 39 | — | — | — | — | — | ... | ... | ... | |
| 9  | — | 18 | 36 | — | — | — | — | — | {C | 18 | 9000 | |
|    |    |    |    |    |    |    |    |    |  A | 20 | 5000 | |
| 10 | — | 20 | 34 | — | — | — | — | — | A | 19 | 8000 | |
| 11 | — | 24 | 30 | — | — | — | — | — | B | 17 | 9000 | |
| 12 | — | 26 | 28 | — | — | — | — | — | B | 19 | 8000 | |
| 13 | — | 28 | 26 | — | — | — | — | — | A | 13 | 6000 | |
| 14 | — | 30 | 24 | — | — | — | — | — | ... | ... | ... | Coarse crystallization |
| 15 | 44 | 15 | 32 | — | — | — | — | — | D | 11 | 3000 | Dispersion of the results |
| 16 | 41 | 18 | — | — | — | — | — | — | D | 15 | 5000 | |
| 17 | 39 | 20 | — | — | — | — | — | — | A | 20 | 7000 | |
| 18 | 35 | 24 | — | — | — | — | — | — | B | 19 | 8000 | |
| 19 | 33 | 26 | — | — | — | — | — | — | A | 17 | 5000 | |
| 20 | 30 | 29 | — | — | — | — | — | — | C | 10 | 4000 | |
| 21 | 40 | 28 | 23 | — | — | — | — | — | ... | ... | ... | Coarse crystallization dispersion |
| 22 | 34 | 31 | 26 | — | — | — | — | — | A | 12 | 4000 | |
| 23 | 34 | 15 | 42 | — | — | — | — | — | ... | ... | ... | Devitrification |
| 24 | 40 | 13 | 38 | — | — | — | — | — | ... | ... | ... | Coarse crystallization |
| 25 | 37 | 22 | 30 | 2 | — | — | — | — | A | 18 | 7000 | |
| 26 | 37 | 22 | 26 | 6 | — | — | — | — | B | 17 | 7000 | |
| 27 | 37 | 22 | 22 | 10 | — | — | — | — | B | 10 | 3000 | |
| 28 | 37 | 21 | 31 | — | — | — | 2 | — | C | 11 | 5000 | Heterogenous crystallization |
| 29 | 37 | 20 | 29 | — | — | — | 5 | — | ... | ... | ... | Coarse and heterogeneous crystallization |
| 30 | 36.75 | 22 | 32 | — | — | — | — | 0.5 | C | 17 | 6000 | |
| 31 | 36.25 | 21.5 | 31.5 | — | — | — | — | 2 | B | 12 | 4000 | |

The applicant has also noted that it can be advisable to replace some of the CaO by MgO when it is desired to improve certain properties of the glass (increasing the working range, reduction of the devitrification tendency) if the quantity of MgO is kept less than 10%. However, it is advisable not to reduce the quantity of CaO below 25%, this oxide occurring in the main kinds of crystals developed during the ceramification process.

The applicant also noted that Al$_2$O$_3$ and B$_2$O$_3$ act on the properties of the glass in the range of the contents claimed and produce, in particular, a lengthening of the working range and a reduction in the devitrification tendency. In addition, the presence of these elements is advantageous to the chemical resistance and more specifically to the resistance to acids and bases, not only in the case of intermediate glass forms (mother glass forms) but also in the case of vitroceramified materials. In view of the cost of the raw materials and/or difficulties encountered during fusion, a good compromise is obtained with quantities generally lower than 6%, both in the case of B$_2$O$_3$ and Al$_2$O$_3$.

I claim:

1. A vitroceramic product containing at least 90% by weight of the sum of the following ingredients expressed in percent by weight of the sum thereof:

| | |
|---|---|
| SiO$_2$ + Al$_2$O$_3$ + B$_2$O$_3$ | 40–50% |
| Iron oxides (expressed in the form of ferric iron oxide - Fe$_2$O$_3$) | 16–30% |
| CaO + MgO (wherein MgO may be 0%), | 24–40% | the sum of Al$_2$O$_3$ + B$_2$O$_3$ being 2–15%; said product including at least 0.5% by weight of a nucleus forming agent.

2. A vitroceramic product according to claim 1 in which said nucleus forming agent is Cr$_2$O$_3$ and in which the sum of P$_2$O$_5$ and F$^-$ if present, expressed in the form of (PO$_4$)$_2$Ca$_3$ and F$_2$Ca respectively, is less than 3% by weight of the product.

3. A vitroceramic product according to claim 2 in which the percent by weight of said ingredients and nucleus forming agent are:

SiO$_2$ — 34–40
Al$_2$O$_3$ — 2–6
B$_2$O$_3$ — 2–6
CaO — 25–38
MgO — 0–10
Fe$_2$O$_3$ — 18–27
Cr$_2$O$_3$ — 0.7–2

4. A vitroceramic product according to claim 3 in which the quantity F$^-$ expressed in the form of F$_2$Ca is less than 1%.

5. A vitroceramic product according to claim 1 in which the total quantity of alkaline oxides is less than 3% by weight.

6. A process for producing a vitroceramic product according to claim 1 comprising vitrifying vitrifiable mixtures corresponding to the products of claim 1 to form a glass, nucleating said glass by heating at a temperature of between 675° to 850° C. for a time sufficient to form fine crystalline nuclei therein, and crystallizing said glass at a temperature of between 850° to 1,000° C. to form fine crystals from the nuclei.

7. The process according to claim 6 wherein said nucleus forming agent is Cr$_2$O$_3$.

* * * * *